Patented Apr. 22, 1969

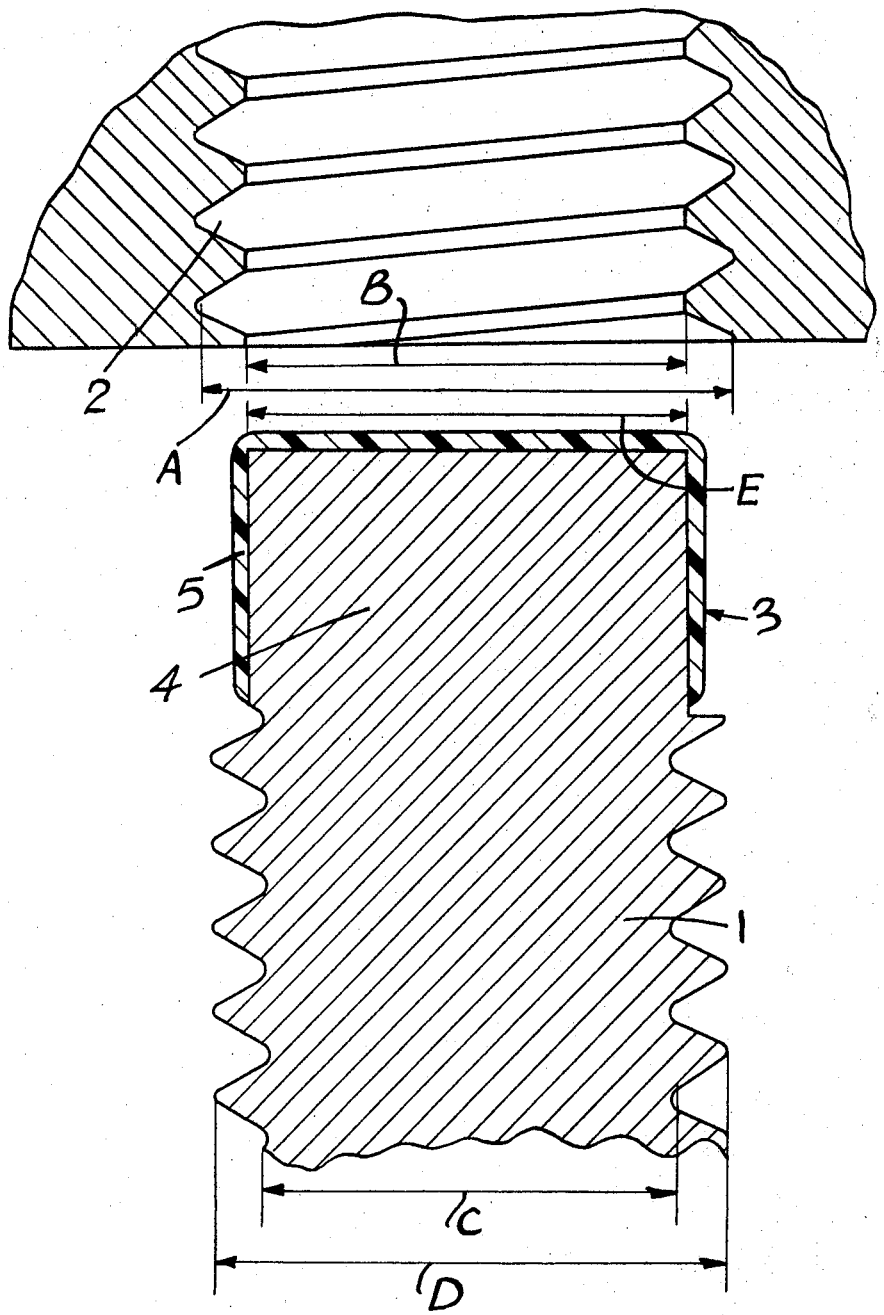

3,439,575
SCREWS, BOLTS AND LIKE FASTENINGS
Guthrie William Gifford, "Furtherside," Thornhill Road, Streetly, Coldfield, Warwickshire, Sutton, England
Filed Sept. 20, 1967, Ser. No. 669,026
Claims priority, application Great Britain, Sept. 20, 1966, 41,947/66
Int. Cl. F16b 35/00
U.S. Cl. 85—1                                   2 Claims

ABSTRACT OF THE DISCLOSURE

A screw, bolt or like fastener comprising a screw threaded shank and a spigot at one end of said shank including a core portion having a coating of readily deformable material thereon which is of such shape and dimensions relative to the screw threaded shank so as to be a push fit in a complementary threaded hole.

---

This invention relates to screws, bolts and like fasteners and has as an object to provide a screw, bolt or like fastener in a convenient form.

A screw, bolt or like fastener in accordance with the invention has a screw threaded shank and a spigot at one end of said shank which is of such shape and dimensions relative to the screw threaded shank so as to be a push fit in a complementary threaded hole.

Preferably, for work where very low tolerances are not required, the spigot comprises an integral core of diameter less than the minimum internal diameter of a hole into which it is to be fitted, and a coating of deformable material on said core of thickness sufficient to make the diameter of the spigot exceed the minimum internal diameter of the hole.

Reference is now made to the accompanying drawing which shows the application of an example of the invention to an 150 metric screw or bolt, the drawing being a diagrammatic section to show the relative dimensions of the screw and the co-acting threaded hole.

Referring to the drawing, the screw 1 has a threaded shank with a standard ISO metric medium fit thread. Full details of the thread dimensions, tolerances etc., can be obtained by reference to British Standards 3643, part 1 (1963) and 3643, part 2 (1965). Briefly, however, the screw has a major diameter D somewhat smaller than the nominal screw size. The flanks of the thread are inclined at an angle of 60° to one another and the major diameter is the diameter at which the flanks are spaced by one-eighth of the pitch of the thread. The minor diameter C is measured where the flanks are spaced by one quarter of the pitch.

Purely by way of example an ISO metric medium fit screw of nominal 5 mm. diameter will have major diameter D in the range 4.82 to 4.97 mm. and a major diameter C in the range 3.842 to 3.995 mm.

Such a screw can coact satisfactorily with a threaded hole 2 of major internal diameter A and minor internal diameter B. Such diameters are again measured where the flanks of the thread are spaced by one-eighth of the pitch and one quarter of the pitch respectively. A 5 mm. tapped hole would have a major diameter A of not less than 5 mm. (no upper limit is specified) and a minor diameter B in the range 4.134 to 4.334 mm.

The end of the shank of the screw 1 is formed with a spigot 3, which consists of a core 4 integral with the shank and a coating 5 of wax or any other suitable deformable material. The diameter E of the spigot core 4, which is co-axial with the shank, is not greater than the minimum minor internal diameter of the hole 2 permitted by the standard specification. Thus for a nominal 5 mm. screw the spigot core diameter should be less than or equal to 4.134 millimeters. In practice a diameter E in the range 4.084 to 4.134 mm. will suffice.

Thickness of the wax coating 5 is sufficient to make tthe total diameter of the spigot 3 greater than the maximum permissible minor diameter of the tapped hole 2. In the specific case mentioned therefore, the wax coating thickness should exceed 4.334–4.084 mm./2, i.e., 125 mm. In practice a coating of thickness in the range .15 to .25 mm. would be satisfactory. The length of the spigot should be sufficient to ensure that it is stably received by the coacting hole. A length in excess of three pitches of the thread will normally be acceptable.

The manufacture of the screws 1 with the spigots 3 is not an unduly difficult proposition. The screws are collected from the thread rolling machine and caused to run along a track passing over a container filled with the wax, so as to dip the spigots into the wax. The heat generated by the thread rolling operation will make the screws sufficiently hot to keep the wax at a temperature slightly above its melting point. Additional heat can, of course, be applied if required.

In use, a screw 1 as described can be very easily engaged in the complementary screw threaded hole 2 by insertion of the spigot 3. The screw 1 can then be released whilst any other screws involved in a particular assembly job are similarly engaged or whilst other operations are carried out. As a result of the push fit, there is little danger of the screw 1 becoming misplaced, whatever its orientation. When desired the screw threads can be interengaged using a screwdriver or other tool suitable for the head of the screw. The spigot 3, by correctly aligning the screw or bolt with the screw threaded hole, also substantially reduces the possibility of cross threading.

The invention will not only materially speed up assembly operations, but also is of particular advantage when the screws are used in positions to which access is gained only with difficulty. Screws, can for example, simply be located in and driven upwardly into overhead tapped holes.

It will be apreciated that the ISO metric thread is quoted purely by way of example. The invention can be applied to all types of thread provided that the prescribed tolerances are correctly taken into account when choosing the diameter of the spigot core and the thickness of the coating.

The invention also comprehends a high, precision screw (not shown) in which the spigot has no coating, but is itself formed to a diameter very slightly greater than the minor diameter of the thread of the hole in which it is to be engaged.

Having thus described my invention what I claim as new and desire to secure by Letters Patent is:

1. An externally screw-threaded fastener, in combination with a member having a complementary threaded hole, said fastener comprising a screw-threaded shank and a spigot at one end of said shank defining a smooth surfaced cylindrical portion of a length at least as great as that of three pitches of the thread on the shank, said spigot comprising an integral core on the end of the shank and of diameter greater than the minor diameter of the threaded shank, but less than the minor diameter of said threaded hole in said member, and a coating of readily deformable material on the core, whereby the outer diameter of the spigot including the deformable material is greater than the minor diameter of the hole so that the spigot is a push fit in the hole.

2. A screw, bolt or like fastener as claimed in claim 1 in which said coating is formed of wax.

(References on following page)

References Cited

UNITED STATES PATENTS

| | | | |
|---|---|---|---|
| 667,555 | 2/1901 | McGahan | 85—10.1 |
| 1,526,182 | 2/1925 | Rosenberg | 85—41 |
| 3,124,031 | 3/1964 | Knohl. | |
| 3,339,003 | 8/1967 | Cessna. | |

FOREIGN PATENTS 19,448  10/1914  France.

CARL W. TOMLIN, *Primary Examiner.*

R. S. BRITTS, *Assistant Examiner.*